US008987427B2

(12) United States Patent
Qiu et al.

(10) Patent No.: US 8,987,427 B2
(45) Date of Patent: Mar. 24, 2015

(54) HIGHLY EFFICIENT LIGNIN-BASED WATER-REDUCING AGENT WITH HIGH DEGREE OF SULFONATION AND HIGH MOLECULAR WEIGHT, AND PREPARATION METHOD THEREOF

(75) Inventors: Xueqing Qiu, Guangzhou (CN); Hongming Lou, Guangzhou (CN); Yuxia Pang, Guangzhou (CN); Dongjie Yang, Guangzhou (CN); Xinping Ouyang, Guangzhou (CN); Conghua Yi, Guangzhou (CN)

(73) Assignee: South China University of Technology, Guangzhou (CN)

( * ) Notice: Subject to any disclaimer, the term of this patent is extended or adjusted under 35 U.S.C. 154(b) by 504 days.

(21) Appl. No.: 13/378,645

(22) Filed: Dec. 15, 2011

(65) Prior Publication Data

US 2013/0096285 A1   Apr. 18, 2013

Related U.S. Application Data

(63) Continuation of application No. PCT/CN2010/073534, filed on Jun. 4, 2010.

(30) Foreign Application Priority Data

Jun. 19, 2009   (CN) .......................... 2009 1 0040399

(51) Int. Cl.
| | | |
|---|---|---|
| *C07G 1/00* | (2011.01) | |
| *C08H 7/00* | (2011.01) | |
| *C08L 97/00* | (2006.01) | |
| *C04B 24/18* | (2006.01) | |
| *C04B 103/30* | (2006.01) | |

(52) U.S. Cl.
CPC ... *C08H 6/00* (2013.01); *C04B 24/18* (2013.01); *C04B 2103/302* (2013.01)
USPC ........................................................ 530/501

(58) Field of Classification Search
CPC .................................................... C08H 6/00
USPC ........................................................ 530/501
See application file for complete search history.

(56) References Cited

U.S. PATENT DOCUMENTS

| | | | |
|---|---|---|---|
| 4,239,550 A | | 12/1980 | Kohler |
| 4,521,336 A * | | 6/1985 | Dilling ........................... 530/501 |
| 8,497,359 B2 * | | 7/2013 | Fenn et al. .................... 530/501 |
| 2003/0004246 A1 * | | 1/2003 | Wache et al. ................. 524/425 |
| 2007/0260046 A1 * | | 11/2007 | Tomita et al. ................. 530/500 |
| 2010/0204368 A1 * | | 8/2010 | Benko et al. .................... 524/73 |
| 2011/0124847 A1 * | | 5/2011 | Chen et al. .................... 530/501 |

FOREIGN PATENT DOCUMENTS

CN   101575418 A   * 11/2009

OTHER PUBLICATIONS

Machine translation of CN 101575418, 2013.*
A. Kamoun et al. "Evaluation of the Performance of Sulfonated Esparto Grass Lignin as a Plasticizer-Water Reducer for Cement," Cement and Concrete Research, 2003, 33, 995-1003.
B. J. Nakano et al. "Chemical Pulping of Straws: Preparation of Lignin Dispersant from Black Liquor of Rice-Straw Soda Cooking," Jpn. Tappi J., 1995, 49, 1079-1085.
T. K. Roy et al. "Utilization of Lignin from Agricultural Residues in the Manufacture of Dispersants," IPPTA Seminar, 1989, 1-12.
D. Y. Matsushita, S. Yasuda, "Reactivity of a Condensed—type Lignin Model Compound in the Mannich Reaction and Preparation of Cationic Surfactant from Sulfuric Acid Lignin," J. Wood Sci. 2003, 49, 166-171.
E D. Y. Chang et al. "Preparation of Concrete Water reducer by Wheat Straw Pulp Black Liquor," Concrete, 1993, 5, 32-36.
F. Y. B. Fan et al. "Development of a Concrete Water-Reducing Admixture Using Lignin from Alkaline Wheat Straw Pulping Black Liquor," Chinese Journal of Enviromental Science, 1995, 4, 46-48.

* cited by examiner

*Primary Examiner* — Liam J Heincer
(74) *Attorney, Agent, or Firm* — CBM Patent Consulting, LLC

(57) ABSTRACT

This invention discloses a high-performance lignin-based water reducer with high degree of sulfonation and high molecular weight and its preparation method. This water reducer exhibits an excellent water-reducing performance, its water-reducing rate of this lignin-based water reducer reaches 25% at a dosage of 0.70 wt %, which is higher than that of the naphthalene-based water reducer and the sulfonated lignin water reducer prepared by oxidation and sulfonation of alkali lignin, and 28-days compressive strength ratio of the concrete with this water reducer to the concrete without this water reducer is up to 150:100. Furthermore, the water reducer of present invention will not be crystallized in winter, and the concrete iron won't be corroded. The water reducer of the present invention makes the concretes having a low bleeding rate, excellent properties of workability, anti-freeze and anti-carbonization.

15 Claims, No Drawings

HIGHLY EFFICIENT LIGNIN-BASED WATER-REDUCING AGENT WITH HIGH DEGREE OF SULFONATION AND HIGH MOLECULAR WEIGHT, AND PREPARATION METHOD THEREOF

This application is a continuation of prior Application No. PCT/CN2010/073534 Filed on 4 Jun. 2010.

FIELD OF THE INVENTION

This invention relates to the field of concrete water reducer. More particularly, this invention relates to a lignin-based water reducer with high degree of sulfonation and high molecular weight and its method for preparation the lignin-based water reducer.

BACKGROUND OF THE INVENTION

According to incomplete statistics, the world's annual output of cement is more than 1.5 billion tons, suggesting that the amount of concrete is at least 4.5 billion $m^3$. China's consumption of concrete is about 1.5 billion $m^3$ every year. It is an effective, simple and economical way for adding water reducer to concrete to improve intensity and the other properties of concrete. In 2007, the consumption of concrete water reducer in China reached 2.85 million tons, including 2.67 million tons of water reducer. With the rapid development of the construction industry and engineering construction, the consumption of concrete is increasing, as well as the demand of the concrete water reducer.

As biomass resources, lignin is second only to cellulose in natural abundance, accounting for 20~30 wt % of plants. The annual output of lignin in world is about 150 billion tons. Industrial lignin comes form chemical pulping. Pulping industries in China can produce 10 billion tons per year of industry lignin, mainly including lignosulfonate in acid pulping waste liquor and alkali lignin in alkaline pulping back liquor. Lignosulfonate is macromolecular compound, consisting of hydrophobic phenylpropane skeleton and hydrophilic sulfonate groups. As an amphiphilic molecule, lignosulfonate has the abilities of adsorption, dispersion and moistening to the solid particles. Lignosulfonate was first used as concrete water reducer in U.S. in 1935, and then used in China in 1970s. However, because of its low water-reducing rate, excessive air-entraining and poor dispersive property, lignosulfonate is generally used as a normal water reducer, or used as a component to compound with high-performance water reducers for improving the workability and air-entraining ability of concrete.

Alkaline pupling (lime method, caustic soda method, caustic soda—anthraquinone method, kraft method, etc.) is the main method that used in China's paper industry, accounting for over 90%. By cooking the raw material, such as wood, bamboo, straw, reed, bagasse, alpine rush and other plants, the cellulose is isolated for papermaking, but the lignin and some hemicellulose (degraded into sugars) which are left in the cooking liquid become the main ingredients of the pulping effluent (referred to as black liquor). For producing one ton of pulp, it will bring about 10 tons of 10 wt % black liquor containing 0.3~0.5 tons of lignin at the same time. The main methods to deal with black liquor are: alkali recovery, acid precipitation, flocculation, concentration and drying, etc. Alkali recovery is the way to retrieve alkali and heat by concentrating dilute black liquor and then burning it. Acid precipitation retrieves the lignin by adjusting the pH of dilute black liquor to strong acidic condition with sulfuric acid. Flocculation retrieves the lignin by depositing the lignin from dilute black liquor with flocculants. Concentration and drying is concentrating dilute black liquor to more than 40 wt % and then spray-drying it to powder. The lignin retrieved from acid precipitation and flocculation is called alkaline lignin. Alkaline lignin has high purity and its molecular weight is relatively higher. The product obtained by concentration and drying is known as a black-liquor-power. The black-liquor-power has almost the same composition as dilute black liquor, cotaining 30~50 wt % lignin, 20~30 wt % alkali, 8~15 wt % inorganic salts, 20~30 wt % sugar, etc. Based on protection of environment and utilization of renewable resource, large-size enterprises generally use the method of alkali recovery, while small or medium-size enterprises mostly retrieve alkaline lignin by acid precipitation or gain the black-liquor-power from concentration and drying. Alkaline lignin is insoluble in waters under neutral condition, so it can't be used as water reducer. The use of black liquor is more difficult because of its complex components and multiple impurities. Thus, chemical modification is an important way to realize the utilization of resource from alkaline lignin and black liquor.

Sulfonatin modification is the most effective way to modify alkali lignin for improving its water solubility and dispersive ability. For example, Kamouna et al. prepared a water reducer by sulfonating alkali lignin from esparto grass pulp back liquor (A. Kamoun et al. "Evaluation of the Performance of Sulfonated Esparto Grass Lignin as a Plasticizer-Water Reducer for Cement," *Cement and Concrete Research*, 2003, 33, 995-1003). The process of preparation was as follows: Needlegrass alkali lignin was first extracted from black liquor, and then separated and purified. Sodium sulfite and formaldehyde were added into the alkali lignin solution, and the solution pH was adjusted to 7~9. The reaction was allowed to continue for 3~6 h at 130~160° C., and the final product was used as a concrete water reducer wherein the water-reducing rate was 7%-12%. Nakano et al prepared a water reducer from rice-straw pulp back liquor by sulfomethylation, purification and compounding (J. Nakano et al. "Chemical Pulping of Straws: Preparation of Lignin Dispersant from Black Liquor of Rice-Straw Soda Cooking," *Jpn. Tappi J.*, 1995, 49, 1079-1085). Roy et al. gained sulfonated alkali lignin from bagasse back liquor, rice straw back liquor, and wheat straw back liquor by two steps of sulfonation at 140~150° C., and the resulting sulfonated alkali lignin has a good dispersive property (T. K. Roy et al. "Utilization of Lignin from Agricultural Residues in the Manufacture of Dispersants," *IPPTA Seminar*, 1989, 1-12). Matsushita and Yasuda obtained sulfonated alkali lignin by first activating the alkaline lignin with phenol, and then modifying it by sulfomethylation, hydroxymethylation and aryl sulfonation (Y. Matsushita, S. Yasuda, "Reactivity of a Condensed-type Lignin Model Compound in the Mannich Reaction and Preparation of Cationic Surfactant from Sulfuric Acid Lignin," *J. Wood Sci.* 2003, 49, 166-171). Chang et al. prepared a water reducer by sulfonation of the alkaline lignin from wheat straw pulp black liquor wherein the water-reducing rate was more than 8% (D. Y. Chang et al. "Preparation of Concrete Water reducer by Wheat Straw Pulp Black Liquor," *Concrete*, 1993, 5, 32-36). Fan et al. also obtained a sulfonated water reducer possessing a water-reducing rate of 10% (Y. B. Fan et al. "Development of a Concrete Water-Reducing Admixture Using Lignin from Alkaline Wheat Straw Pulping Black Liquor," *Chinese Journal of Enviromental Science*, 1995, 4, 46-48).

U.S. Pat. No. 4,239,550 discloses flowing agents for mortar and concrete comprised of mixture of sulfonated lignin and sulfomethylated or ring-sulfonated aromatic compounds.

U.S. Pat. No. 4,367,094 discloses slump reduction-preventing agents which mainly contain a sulfonated lignin having a carboxyl group content of at least 0.2 mols and a sulfonic group content of at least 0.1 mols per phenyl propane unit. CN 02100805.1 discloses concrete admixtures of sulfonated lignin prepared by reaction of straw pulping black liquor with formaldehyde and sulfite. CN 00131005.4 discloses a cement dispersant prepared by introducing carboxyl groups through electrooxidation of lignin, and then introducing sulfonic groups through sulfomethylation of lignin at 100~175° C. CN 200510032657.7 discloses a method of preparing a high-performance water reducer by oxidation, sulfonation, condensation of alkaline lignin. CN 200410044834.9 discloses a method of preparing a sulfonated lignin water reducer though concentration, catalytic sulfonation, and compound of black liquor wherein the performance of the water reducer is in line with GB8076-1997 first-class product standards.

There are other reports about preparing water reducers by first sulfonating alkali lignin and then grafting with other high-performance water reducer. CN 200710051834.5 discloses a preparation method of a high-performance water reducer comprising a graft polymerization of herbal lignin sulfonate and naphthalene sulfonic acid wherein the weight ratio of lignin sulfonate to reactant naphthalene is 20%-240%. CN 200710130819 discloses a high-performance water reducer wherein 10 wt % dilute black liquor is modified by pre-homogenizing and sulfonating, and then treated by grafting with carbonyl aliphatic compounds. The water reducing rate of this water reducer is up to 22~26%.

Although sulfonated alkaline lignin (containing the sulfonation product of black liquor) has advantages of abundant natural resources and low cost, it can only be used as normal water reducer because of its poor dispersive property. It was found that sodium lignosulfonate recoveried from acid pulping waste liquor has a weight-average molecular weight of 5000, and the degree of sulfonation is less than 1.5 mmol/g; the degree of sulfonation of sulfonated alkaline lignin is up to 2.0~2.5 mmol/g (sulfonation degree is up to 3.0 mmol/g under microwave irradiation), but its weight-average molecular weight is less than 3500. Compared with sodium lignosulfonate, sulfonated alkaline lignin has higher sulfonation degree, but less molecular weight. Thus, the application of the sulfonated alkaline lignin is limited because its dispersive property is worse than sodium lignosulfonate.

The reason why sulfonated alkali lignin cannot become a high-performance water reducer is that the degree of the sulfonation and the molecular weight cannot be increased simultaneously. The structural characteristics of alkaline lignin lie in its high degree of condensation, and the ortho-position and para-position of phenolic hydroxyl in the stucure of guaiacyl and syringyl are occupied by methoxyl and side chains. Since the content of methoxyl is high, the active points for sulfonation and condensation reaction are relatively low. Therefore it is very difficult for sulfonated alkali lignin to elevate the degree of sulfonation and the molecular weight simultaneously.

SUMMARY OF THE INVENTION

The Objective

The purpose of this invention is to obtain a high-performance lignin-based water reducer with high degree of sulfonation and high molecular weight.

Another purpose is to provide a method for preparing a high-performance lignin-based water reducer with high degree of sulfonation and high molecular weight.

Technical Strategy

The purpose of this invention is to overcome the shortcomings of existing technology to obtain a high-performance lignin-based water reducer with high degree of sulfonation and high molecular weight. Industrial lignins (including alkali lignin and black liquor) are selected to be the raw materials for preparing this water reducer because industrial lignins are abundant, cheap and renewable. The water reducer is obtained by grafting and sulfonating of industrial lignins. This water reducer has a high water-reducing rate and does not crystallize in winter. This water reducer can keep stable performance, so it can be applicable to various concrete mixture and ready-mix concrete production.

In this invention, the said high degree of sulfonation is that the degree of sulfonation of this water reducer is larger than 2.5 mmol/g, and the said high molecular weight is that the molecular weight of this water reducer is higher than 10000.

This invention relates to graft copolymerization of lignin and dihydroxyketone under atmospheric pressure through etherification. The side chains containing active carbonyl and hydroxyl are introduced into lignin, and then the sulfonic groups is introduced via addition reaction of to carbonyl and sulfite. Thus, sulfonated lignin with high degree of sulfonation and high molecular weight can be obtained and used as a high-performance water reducer.

The Technical Solution of the Present Invention is as Follows

The method for preparing a high-performance lignin-based water reducer with high degree of ulfonation and high molecular weight includes the following steps:

(1) Add industrial lignin to water and adjust the mass concentration of lignin to 30~60 wt % by total weight of the aqueous solution of the industrial lignin. Set the solution pH to 9~14, and raise the solution temperature to 50~100° C.

(2) Add dihydroxyketone into above solution, and let the reaction continue for 0.5~2 h.

(3) Add the sulfonating agent into the above solution, and let the sulfonation reaction take place at temperature of 80~100° C. for 1~5 h. When the reaction mixture is cooled down to room temperature, you obtain the product of lignin-based water reducer with high degree of sulfonation and high molecular weight.

Weight ratio of industrial lignin:dihydroxyketone:sulfonating agent is 100:20~50:30~200.

Suitable industrial lignin is one or more industrial lignins selected from wood pulp alkali lignin, bamboo pulp alkali lignin, wheat straw pulp alkali lignin, reed pulp alkali lignin, bagasse pulp alkali lignin, alpine rush pulp alkali lignin, wood pulp black liquor, bamboo pulp black liquor, wheat straw pulp black liquor, reed pulp black liquor, bagasse pulp black liquor, alpine rush pulp black liquor, or any combination thereof.

Suitable dihydroxyketones is one or more dihydroxyketones selected from dihydroxyacetone, dihydroxybutanone, dihydroxypentanone or dihydroxyhexanone.

Suitable sulfonating agents is one or more sulfonating agents selected from sodium metabisulfite, sodium sulfite and sodium bisulfitethen.

For further implementation of the object of this invention, pH described in step (1) is optimal for 12~14.

The reaction time after adding dihydroxyketone described in step (2) is optimal for 1~2 h.

The sulfonation described in step (3) is optimal for 3~4 h.

The present invention also relates to a high-performance lignin-based water reducer with high degree of sulfonation and high molecular weight prepared according to above method. Wherein the weight-average molecular weight of this water reducer is over 10000, and the sulfonation degree over 2.5 mmol/g.

DETAILED DESCRIPTION OF THE INVENTION

This invention relates to a high-performance lignin-based water reducer with high degree of sulfonation and high molecular weight and a preparation method thereof. The preparation process includes the following steps:
(1) Add industrial lignin to water and adjust the mass concentration of lignin to 30~60 wt % by total weight of the aqueous solution of the industrial lignin. Set the solution pH to 9~14, and raise the solution temperature to 50~100° C.
(2) It is well-known that industrial lignin come from cooking liquor of pulp and paper industry. The properties of industrial lignin vary with the raw materials, pulp technology, and methods of purification. In general, the industrial lignin can be classified into four types: (a) Hydrolytic lignin, obtained from strong acid hydrolysis for producing fermentable sugars from wood. It cannot be dissolved in water and solvents, and has poor chemical reaction activity; therefore, it is often used as fuel. (b) Alkali lignin, mainly obtained from alkali pulping black liquor. (c) Lignosulfonates, obtained from acid sulfite pulping process. It has good water-soluablity and has a wide area of application. (d) The other lignins, such as acetic acid lignin.

Particularly, suitable industrial lignins is one or more industrial lignins selected from wood pulp alkali lignin, bamboo pulp alkali lignin, wheat straw pulp lignin, reed pulp alkali lignin, bagasse pulp alkali lignin, alpine rush pulp alkali lignin, wood pulp black liquor, bamboo pulp black liquor, wheat straw pulp black liquor, reed pulp black liquor, bagasse pulp black liquor or alpine rush pulp black liquor.

The above black liquors, namely, wood pulp black liquor, bamboo pulp black liquor, wheat straw pulp black liquor, reed pulp black liquor, bagasse pulp black liquor, alpine rush pulp black liquor are the cooking black liquor from alkaline pulping in pulp and paper industry and chemical fiber industry. Examples of black liquors include: wood pulp black liquor obtained by alkaline pulping of pinus massoniana lamb from Nanping Paper Co. Ltd (Fujian, China); bamboo pulp black liquor obtained by alkaline pulping of bamboo from Yibing Paper Co. Ltd (Shichuan China); wheat straw pulp black liquor obtained by alkaline pulping of wheat straw from Quanling Paper Co. Ltd (Shandong China).

The above alkali lignins, such as wood pulp alkali lignin, bamboo pulp alkali lignin, wheat straw pulp alkali lignin, reed pulp alkali lignin, bagasse pulp alkali lignin, alpine rush pulp alkali lignin are obtained by membrane filtration, flocculation and acidification of black liquor. Examples of alkali lignins include: alkali lignin obtained by ultrafiltration of pinus massoniana lamb black liquor from Tongdao shenghua Linmu Co. Ltd (Hunan, China); wood pulp alkali lignin obtained by acidification of black liquor from Yongzhou Xiangjiang Paper Co. Ltd of Taigelin Group (Hunan, China).

In the present invention, the concentration of the industrial lignin needs to be controlled at 30~60 wt % by total weight of the aqueous solution of the industrial lignin. If the concentration is less than 30 wt %, the final product will have lower molecular weight, and have poorer water-reducing effect on concrete. If the concentration is higher than 60 wt %, the conversion rate of the product will be lower, as well as the degree of sulfonation, which will cause a lower water-reducing rate of concrete. Therefore, it is important to adjust the concentration of industrial lignin to 30~60 wt %.

For better results, the concentration of industrial lignin can be adjusted to 35~55 wt %.

For optimal results, the concentration of industrial lignin can be adjusted to 40~50 wt %.

During preparation of the product, the pH of the industrial lignin needs to be kept at 9~14. If the pH is lower than 9, the molecular weight of the product will be lower, which will cause lower water-reducing rate of concrete. Therefore, it is important to adjust the solution pH of industrial lignin to 9~14.

For optimal results, the pH of industrial lignin can be adjusted to 12~14.

The pH is adjusted by adding strong bases or acids. Suitable bases include sodium hydroxide, potassium hydroxide, calcium hydroxide, or magnesium hydroxide. The suitable acids are sulfonic acid, hydrochloric acid, or nitric acid.

To adjust the pH, the concentration of bases and acids are not important factors for the products. The concentration of bases and acids are generally 10~30 wt %.
(3) Add dihydroxyketone into above solution, and let the reaction continue for 0.5~2 h.

Suitable dihydroxyketones is one or more dihydroxyketones selected from dihydroxyacetone, dihydroxybutanone, dihydroxypentanone or dihydroxyhexanone.

Dihydroxyacetone is 1,3-dihydroxy acetone.

Dihydroxybutanone is 1,4-dihydroxy-2-butanone.

Dihydroxypentanone is 1,5-dihydroxy-3-pentanone.

Dihydroxyhexanone is 1,5-dihydroxy-3-hexanone.

According to this invention, the graft copolymerization of industrial lignin and dihydroxyketone is carried out through etherification reaction, and the long chains containing active carbonyl and hydroxyl are introduced into lignin.

It is important to regulate the weight ratio of dihydroxyketone to industrial lignin at 20-500:100. If the weight ratio of dihydroxyketone is lower than 20, the final product will have lower molecular weight, and have poorer water-reducing property. If the weight ratio of dihydroxyketone is higher than 500, the reaction will be too drastic to control. Also, the whole cost will increase.

For optimal results, the weight ratio of dihydroxyketone to industrial lignin should be 60-400:100.

The optimal reaction time after adding dihydroxyketone described in step (2) is 1~2 h.
(3) Add the sulfonating agent into the above solution, and let the sulfonation reaction take place at 80~100° C. for 1~5 h. When the reaction mixture is cooled down to room temperature, you will obtain the product of lignin-based water reducer with high degree of sulfonation and high molecular weight.

During graft copolymerization described in step (2), the long chains containing active carbonyl have been introduced into lignin. When adding the sulfonating agent into the above solution, the sulfonic groups can be introduced into the long chains via addition reaction of carboxyl and sulfite. Because the graft copolymerization has increased active sites in long chains, the sulfonation reaction can occur in long chains to avoid the space obstacles of the lignin structure. In this way, grafting and sulfonation can increase the molecular weight and the degree of the sulfonation. As a result, the degree of sulfonation and the molecular weight of the final product are both higher than that of lignosulfonates.

Suitable sulfonating agents is one or more sulfonating agents selected from sodium metabisulfite, sodium sulfite or sodium bisulfitethen.

The sodium metabisulfite, sodium sulfite and sodium bisulfitethen are widely available in the market.

According to this invention, the weight ratio of sulfonating agent to industrial lignin is 30-200:100. If the weight ratio of sulfonating agent is less than 30, the degree of sulfonation of the product will be lower, which will cause poor water reducing property of concrete. If the weight ratio of sulfonating agent is larger than 200, the conversion of sulfonation will be lower, which will waste materials. Therefore, it is important to adjust the weight ratio of sulfonating agent to industrial lignin to 30-200:100. For optimal results, the weight ratio of sulfonating agent to industrial lignin should be adjusted to 50-150:100.

The optimal sulfonation time described in step (3) is 3~4 h.

The present invention also relates to a high-performance lignin-based water reducer with high degree of sulfonation and high molecular weight prepared according to the above method. The weight-average molecular weight of the water reducer is over 10000, and the sulfonation degree is over 2.5 mmol/g.

The molecular weight is measured by gel permeation chromatography with standard sample of poly(styrene sulfonate). The 0.10 mol/L $NaNO_3$ aqueous solution with pH 8 was used as the eluent at a flow rate of 0.5 mL/min.

The degree of sulfonation is measured by automatic potentiometric titration with standard solutions of sodium hydroxide.

ADVANTAGES

Compared with the existing technology, the present invention has the following advantages:
1. Compared with lignosulfonates, the lignin-based water reducer of this invention has a higher degree of sulfonation and higher molecular weight. The weight-average molecular weight of the product is over 10000, and the sulfonation degree is over 2.5 mmol/g.
2. This water reducer exhibits an excellent water-reducing performance. The water-reducing rate of this lignin-based water reducer reaches 25% at a dosage of 0.70 wt %, which is higher than that of the naphthalene-based water reducer and the sulfonated lignin water reducer prepared by oxidation and sulfonation of alkali lignin. The water-reducing rate of this water reducer is close to that of aliphatic water reducer. At 28-days, the compressive strength ratio of the concrete with this water reducer to the concrete without this water reducer is up to 150:100 higher than that of the control concrete. This water reducer does not crystallize in winter because the content of sodium sulfonate is less than 1 wt %, and does not corrode concrete iron because the content of chloride ion is less than 0.1 wt %. This water reducer has a low bleeding rate because the air content is 2.5~3.0 wt %. When used in concrete, this water reducer allows concrete to exhibit good properties of workability, antifreeze and anti-carbonization.
3. The product has good adaptability. This lignin-based water reducer is compatible with polycarboxylate-type water reducer, so a compound water reducer can be prepared by mixing the two types of water reducer.

EXAMPLES

The present invention can be further described by the following examples. The examples do not intend to limit the scope of the present invention.

Example 1

The water reducer was prepared through the following steps: adding 100 g wheat straw alkaline lignin powder into 200 g water to make a mass concentration of 50 wt %, adjusting the pH to 9 with 20 wt % NaOH solution, and raising the solution temperature to 50° C.; adding 120 g dihydroxyketone aqueous solution (80 g dihydroxyacetone in 40 g water) into the wheat straw alkali lignin solution, and letting the reaction continue for 3 h; adding 160 g 30 wt % sodium sulfite into above solution, and letting it react at 100° C. for 3 h; cooling the resulting solution down to room temperature and then obtaining a lignin-based water reducer power by spray drying.

According to the test methods described in this invention, the weight-average molecular weight of the lignin-based water reducer was measured to be 20900, and the degree of sulfonation was measured to be 2.64 mmol/g.

Example 2

The water reducer was prepared through the following steps: adding 50 g wheat straw alkaline lignin powder into 100 g water to make a mass concentration of 50 wt %, adjusting the pH to 13 with 20 wt % NaOH solution, and raising the solution temperature to 60° C.; adding 200 g dihydroxybutanone aqueous solution (100 g dihydroxybutanone in 100 g water) into the wheat straw alkali lignin solution, and letting the reaction continue for 1.5 h; adding 180 g 30 wt % sodium metabisulfite into above solution, and letting it react at 80° C. for 5 h; cooling the resulting solution down to room temperature and then obtaining a lignin-based water reducer power by spray drying.

According to the test methods described in this invention, the weight-average molecular weight of the lignin-based water reducer was measured to be 22600, and the degree of sulfonation was measured to be 2.59 mmol/g.

Example 3

The water reducer was prepared through the following steps: adding 200 g 50 wt % bamboo pulp black liquor into a reactor, adjusting the pH to 14 with 10 wt % $H_2SO_4$ solution, and raising the solution temperature to 55° C.; adding 120 g dihydroxypentanone aqueous solution (50 g dihydroxypentanone in 70 g water) into the bamboo pulp black liquor, and letting the reaction continue for 2 h; adding 200 g 30 wt % sodium sulfite into above solution, and letting it react at 95° C. for 5 h; cooling the resulting solution down to room temperature and then obtaining a lignin-based water reducer power by spray drying.

According to the test methods described in this invention, the weight-average molecular weight of the lignin-based water reducer was measured to be 25700, and the degree of sulfonation was measured to be 2.71 mmol/g.

Example 4

The water reducer was prepared through the following steps: mixing 25 g wheat straw alkaline lignin power, 50 g water, 50 g 50 wt % bamboo pulp black liquor and 100 g 50 wt % wood pulp black liquor, adjusting the pH to 12 with 10 wt % $H_2SO_4$ solution, and raising the solution temperature to 80° C.; adding 400 g mixed aqueous solution of dihydroxyacetone, dihydroxypentone, dihydroxyhexanone (50 g dihydroxyacetone, 100 g dihydroxypentone, 50 g dihydroxyhexanone in 200 g water) into the above solution, and letting the reaction continue for 0.5 h; adding 200 g 30 wt % sodium sulfite into above solution, and letting it react at 95° C. for 3 h; cooling the resulting solution down to room temperature and then obtaining a lignin-based water reducer power by spray drying.

According to the test methods described in this invention, the weight-average molecular weight of the lignin-based water reducer was measured to be 20700, and the degree of sulfonation was measured to be 2.78 mmol/g.

Example 5

The water reducer was prepared through the following steps: mixing 100 g 50 wt % bamboo pulp black liquor and 100 g 50 wt % alpine rush pulp black liquor, adjusting the pH to 14 with 10 wt % $H_2SO_4$ solution, and raising the solution temperature to 55° C.; adding 200 g dihydroxypentone solution (80 g dihydroxypentone in 120 g water) into the above solution, and letting the reaction continue for 2 h; adding mixture of 120 g 30 wt % sodium sulfite and 120 g 30 wt % sodium metabisulfite into above solution, and letting it react at 98° C. for 3 h; cooling the resulting solution down to room temperature and then obtaining a lignin-based water reducer power by spray drying.

According to the test methods described in this invention, the weight-average molecular weight of the lignin-based water reducer was measured to be 27600, and the degree of sulfonation was measured to be 2.90 mmol/g.

Description of the Test Results in Examples

The test results of the lignin-based water reducers in the present invention are shown in Table 1. The test results includes the weight-average molecular weight, the degree of sulfonation, water-reducing rate, and dispersive performance.

TABLE 1

The structure and properties of various lignin-based water-reducing agent

| types of water reducer | Weight-average molecular weight | Degree of sulfonation (mmol/g) | Paste Fluidity (mm) | Water-reducing rate (%) | 28-days compressive strength ratio |
|---|---|---|---|---|---|
| The sodium lignosulfonate (wood pulp) | 5200 | 1.45 | 125 | 11.5 | 116.2:100 |
| The sulfonated alkaline lignin (wheat straw pulp) | 3200 | 2.15 | 100 | 10.5 | 104.3:100 |
| The product of example 1 | 20900 | 2.64 | 210 | 21.5 | 125.7:100 |
| The product of example 2 | 22600 | 2.59 | 225 | 21.5 | 122.8:100 |
| The product of example 3 | 25700 | 2.71 | 235 | 25.5 | 142.2:100 |
| The product of example 4 | 20700 | 2.78 | 235 | 22.5 | 136.1:100 |
| The product of example 5 | 27600 | 2.90 | 230 | 25.5 | 140.5:100 |
| The naphthalene-type high-performance water reducer | — | — | 210 | 21.0 | 130.5:100 |
| The aliphate-type high-performance water reducer | — | — | 235 | 25.5 | 138.8:100 |
| The standard of high-performance water reducer | — | — | 200 | 14 | 120:100 |

Description of the Test Methods in Table 1:

(1) The molecular weight is measured by gel permeation chromatography with standard sample of poly(styrene sulfonate). The 0.10 mol/L $NaNO_3$ aqueous solution with pH 8 was used as the eluent at a flow rate of 0.5 mL/min.

The degree of sulfonation is measured by automatic potentiometric titration with standard solutions of sodium hydroxide.

The samples are required to be purified through anion and cation exchange resins wherein the anion exchange resin is 717 strong-base styrene-type anion exchange resin, and the cation exchange resin is 732 strong-acid styrene-type cationic exchange resin from Guangzhou Huada Chemical Reagent Co. Ltd.

(2) Paste fluidity is determined according to GB/T8077-2000. The sample cement for testing paste fluidity is ordinary Portland cement 32.5R (Jinyang Brand). The ratio of water to cement is 0.29:1, and the test temperature is 25° C.

(3) In concrete-testing experiments, the mixed weight ratio of cement:sand:handstone:oishi is 1:2.20:1.46:2.19, and the cement content is 330 kg/m$^3$. The 28 days compressive strength ratio is the ratio of the compressive strength of concrete with a water reducer to that of concrete without the water reducer at 28 days.

(4) The sodium lignosulfonate (wood pulp) is the wood pulp obtained by acid sulfite pulping process from Jilin Shixian paper Co. Ltd.

(5) The sulfonated alkaline lignin (wheat straw pulp) was prepared prepared through the following steps: adding 50 g wheat straw pulp alkali lignin into 100 g 10 wt % NaOH solution; raising the solution temperature to 60° C.; adding 15 g $H_2O_2$ into the above solution, and letting it react at 60° C. for 1 h; adding 30 g 37 wt % industrial formaldehyde solution and letting it react at 85° C. for 2 h; adding 15 g sodium sulfite, and letting the reaction continue for 2 h; cooling the resulting solution down to room temperature and then obtaining a sulfonated alkaline lignin water reducer.

(6) The naphthalene-type and the aliphate type high-performance water reducer are commercial products from Guangdong Dongguan Fusheng industrial Co. Ltd.

(7) The water-reducing rate and 28 days compressive strength ratio that required to meet the standard of high-performance water reducers come from GB8076-2008. Paste fluidity that required to meet the standard of high-performance water reducers come from enterprise standard.

As shown in Table 1, the degree of sulfonation of the water reducer in the present invention is over 2.5 mmol/g, and the weight-average molecular weight of the water reducer is over 10000, which are higher than that of the sodium lignosulfonate (wood pulp) and the sulfonated alkaline lignin (wheat straw pulp). The water reducer in the present invention meets the requirement of a high-performance lignin-based water reducer with a high degree of sulfonation and a high molecular weight. From table 1, it can be seen that the products in the present invention exhibits excellent paste fluidity, water-reducing ability, and compressive strength. Namely, the paste fluidity is larger than 210 mm; the water-reducing rate is larger than 21%, and the maximum water-reducing rate is 25%; 28-days compressive strength ratio is larger than 120:100, and the maximum compressive strength ratio is up to 140:100. These properties of the water reducer in the present invention are much better than that of the sodium lignosulfonate (wood pulp) and the sulfonated alkaline lignin (wheat straw pulp). These properties of the water reducer in the present invention have exceeded the national standard for high-performance water reducers, and have also exceeded the properties of the naphthalene-type high-performance water reducer. These properties of the water reducer in the present invention are close to that of the aliphate type high-performance water reducer. The water reducer in the present invention does not crystallize at 0~5° C.

What is claimed is:

1. A lignin-based water reducer is characterized in that average molecular weight of said water reducer being higher than 10,000 daltons, sulfonation degree of said water reducer being greater than 2.5 mmol/g, which is made from industrial lignin, a dihydroxyketone and a sulfonating agent.

2. The water reducer according to claim 1, the ratio of said industrial lignin:said dihydroxyketone:said sulfonating agent is 100:20-50:30-200 by weight.

3. The water reducer according to claim 1, said industrial lignin is one or more agents selected from wood pulp alkali lignin, bamboo pulp alkali lignin, wheat straw pulp alkali lignin, reed pulp alkali lignin, bagasse pulp alkali lignin, alpine rush pulp alkali lignin, wood pulp black liquor, bamboo pulp black liquor, wheat straw pulp black liquor, reed pulp black liquor, bagasse pulp black liquor or alpine rush pulp black liquor.

4. The water reducer according to claim 1, said dihydroxyketones is one or more agents selected from dihydroxyacetone, dihydroxybutanone, dihydroxypentanone or dihydroxyhexanone.

5. The water reducer according to claim 1, said sulfonating agents is one or more agents selected from sodium metabisulfite, sodium sulfite and sodium bisulfite.

6. A process for preparing a lignin-based water reducer with high degree of sulfonation and high molecular weight consists of following steps:
   (1) adding industrial lignin into water, enabling the concentration of said industrial lignin up to 30~60% by weight, then adjusting the pH of solution to 9-14, and elevating the temperature of said solution to 50-100° C.;
   (2) adding a dihydroxyketone into said industrial lignin solution, and maintaining the reaction for 0.5 hour to 2 hours;
   (3) adding a sulfonating agent into the solution of step (2), and keeping the sulfonation reaction at temperature of 80~100° C. for 1 hour to 5 hours;
   (4) the lignin-based water reducer with high degree of sulfonation and high molecular weight being yielded after the temperature being decreased to room temperature.

7. The process according to claim 6, the ratio of said industrial lignin:said dihydroxyketone:said sulfonating agent is 100:20-50:30-200 by weight.

8. The process according to claim 6, said industrial lignin is one or more agents selected from wood pulp alkali lignin, bamboo pulp alkali lignin, wheat straw pulp alkali lignin, reed pulp alkali lignin, bagasse pulp alkali lignin, alpine rush pulp alkali lignin, wood pulp black liquor, bamboo pulp black liquor, wheat straw pulp black liquor, reed pulp black liquor, bagasse pulp black liquor or alpine rush pulp black liquor.

9. The process according to claim 6, said dihydroxyketones is one or more agents selected from dihydroxyacetone, dihydroxybutanone, dihydroxypentanone or dihydroxyhexanone.

10. The process according to claim 6, said sulfonating agents is one or more agents selected from sodium metabisulfite, sodium sulfite and sodium bisulfite.

11. The process according to claim 6, wherein the pH of the solution is adjusted to 12~14.

12. The process according to claim 6, whereby the reaction time after adding dihydroxyketone in step (2) is between 1 and 2 hours.

13. The process according to claim 6, wherein the reaction time of sulfonation in step (3) is between 3 and 4 hours.

14. The process according to claim 6, wherein the average molecular weight of the water reducer is higher than 10,000 daltons.

15. The process according to claim 6, the degree of sulfonation is greater than 2.5 mmol/g.

* * * * *